US009706816B2

(12) United States Patent
Coakley et al.

(10) Patent No.: US 9,706,816 B2
(45) Date of Patent: Jul. 18, 2017

(54) ZIPPER GUIDE FOR FACILITATING CLOSURE OF OPEN-ENDED ZIPPER

(71) Applicant: Northeastern University, Boston, MA (US)

(72) Inventors: Hannah Coakley, Boston, MA (US); Andrew Gouldstone, Dorchester, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 14/681,751

(22) Filed: Apr. 8, 2015

(65) Prior Publication Data

US 2015/0289606 A1    Oct. 15, 2015

Related U.S. Application Data

(60) Provisional application No. 61/977,312, filed on Apr. 9, 2014.

(51) Int. Cl.
*A44B 19/36* (2006.01)
*A44B 19/38* (2006.01)
*A44B 19/24* (2006.01)
*B33Y 80/00* (2015.01)
*B29L 9/00* (2006.01)
*B29L 5/00* (2006.01)
*A41D 13/12* (2006.01)

(52) U.S. Cl.
CPC .............. *A44B 19/38* (2013.01); *A44B 19/24* (2013.01); *A41D 13/129* (2013.01); *B29L 2005/00* (2013.01); *B29L 2009/00* (2013.01); *B33Y 80/00* (2014.12); *Y10T 24/2593* (2015.01); *Y10T 24/2595* (2015.01)

(58) Field of Classification Search
CPC ......... A44B 19/38; A44B 19/26; A44B 19/24; B33Y 80/00; A41D 13/129; B29L 2005/00; Y10T 24/25; Y10T 24/2511; Y10T 24/2513; Y10T 24/2593; Y10T 24/2595; Y10T 24/2596
See application file for complete search history.

(56) References Cited

U.S. PATENT DOCUMENTS

| 4,875,258 | A | * | 10/1989 | Goedecke | A44B 19/32 24/384 |
| 6,796,015 | B2 | | 9/2004 | Cortigiano, Sr. | |
| 2006/0242804 | A1 | | 11/2006 | Griffiths | |
| 2010/0313387 | A1 | | 12/2010 | Peters et al. | |
| 2013/0061436 | A1 | | 3/2013 | Peters et al. | |

* cited by examiner

*Primary Examiner* — Robert J Sandy
*Assistant Examiner* — Michael Lee
(74) *Attorney, Agent, or Firm* — Posternak Blankstein & Lund LLP

(57) ABSTRACT

A zipper guide is provided to facilitate closure of an open-ended zipper. The zipper guide includes a base to which a zipper tape pin end is attached and a slider to which a zipper tape box end is attached. A key on a lower surface of the slider slides in a trench in an upper surface of the base at an orientation that guides the attached zipper tape box end toward the attached zipper tape pin end by planar sliding movements of the slider lower surface with respect to the base upper surface.

16 Claims, 7 Drawing Sheets

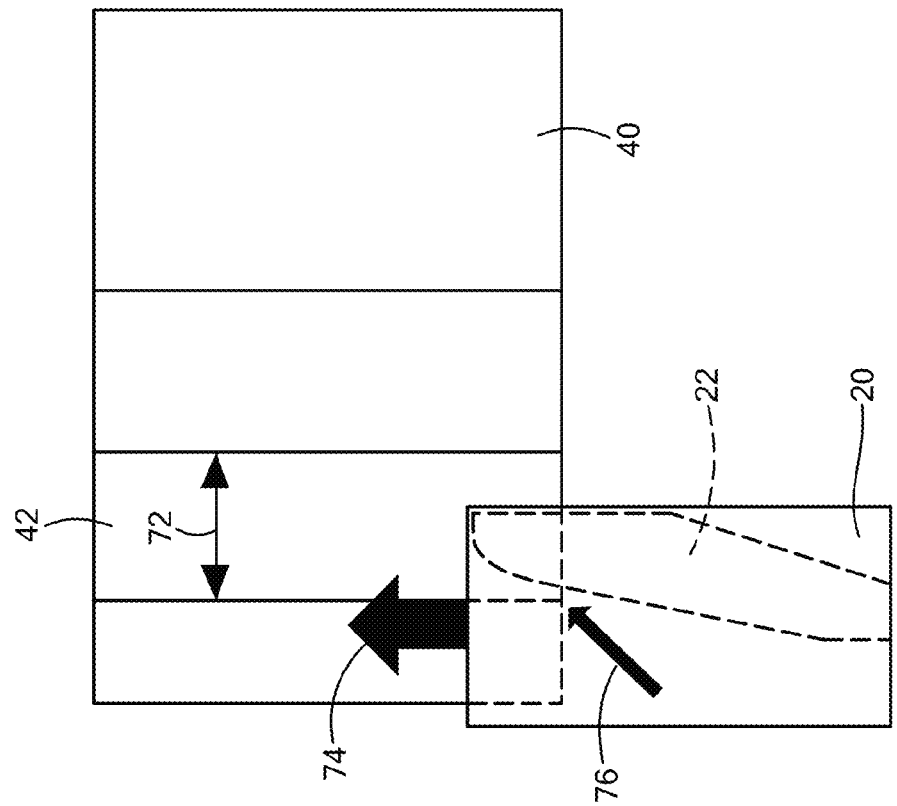
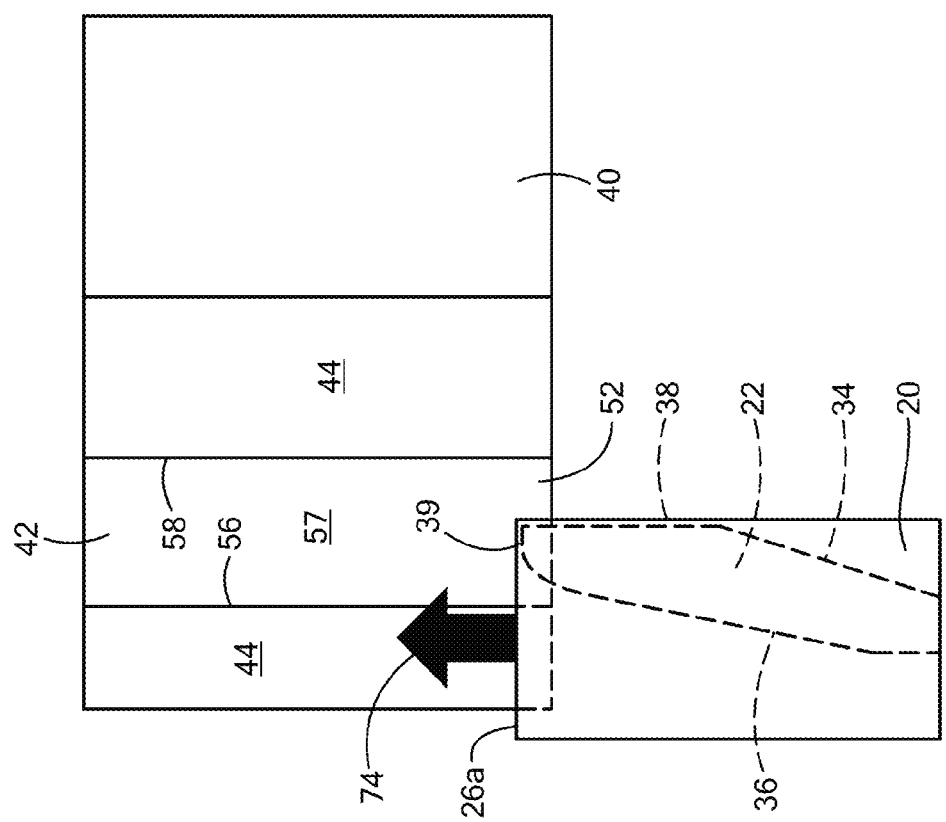

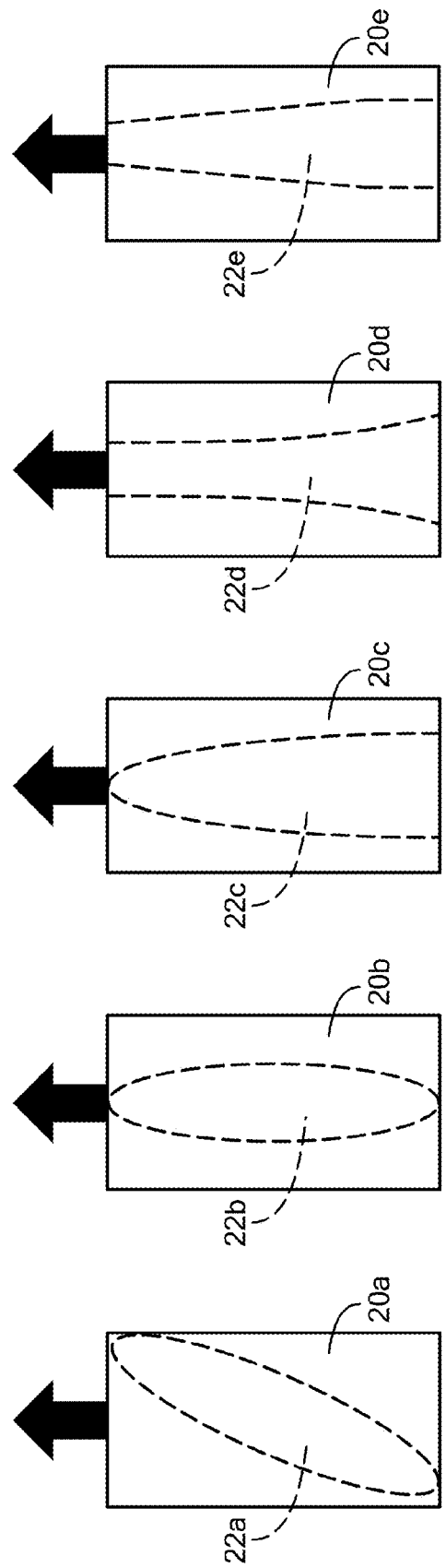

ZIPPER GUIDE FOR FACILITATING CLOSURE OF OPEN-ENDED ZIPPER

CROSS REFERENCE TO RELATED APPLICATIONS

This application claims the benefit under 35 U.S.C. §119(e) of U.S. Provisional Application No. 61/977,312, filed on Apr. 9, 2014, the disclosure of which is incorporated by reference herein.

STATEMENT REGARDING FEDERALLY SPONSORED RESEARCH OR DEVELOPMENT

This invention was made with government support under Grant No. CBET1133992 awarded by the National Science Foundation. The government has certain rights in the invention.

BACKGROUND

Patients suffering from tremor, as in Parkinson's disease or Essential Tremor, have difficulty when performing tasks that require small muscle movements, especially those in the hands. One such task is aligning the two ends of an open-ended zipper, such as on a coat, jacket or sweatshirt.

Open-ended zippers comprise two tapes each having a set of attached zipper teeth, such that the zipper teeth of one tape can interlock with the zipper teeth of the other tape. A pin is provided at a lower end of the first set of zipper teeth, and a box is provided at the lower end of the second set of zipper teeth. The box includes a channel for receiving the pin of the first zipper tape. A pull tab is slidably attached for movement along both sets of teeth to bring the teeth into interlocking engagement as the pull tab is pulled upwardly, and to release the teeth from interlocking engagement as the pull tab is pulled downwardly. The pull tab is fixed for sliding movement on the second set of teeth and is prevented from sliding off the second set by the box at the lower end. The pull tab includes two parallel channels, open at upper and lower ends, within which each set of teeth fit. The channels narrow from the upper end to the lower end, thereby guiding the teeth of each set into interlocking engagement as the pull tab is pulled upwardly away from the box.

To interlock the sets of zipper teeth, a user must grasp the pin of the first tape by one hand and, while holding the pull tab adjacent the box of the second zipper tape, carefully manipulate the pin in three-dimensional space into and through the first channel of the pull tab until the pin fits into the first channel of the box.

SUMMARY OF THE INVENTION

A zipper guide is provided that widens the margin of error associated with aligning the two ends of an open-ended zipper. The user need only place the toothed zipper end against the guide, and pull the zipper pull tab, with no further alignment required. The zipper guide eliminates five degrees of freedom, two linear and three rotational, that are present when attaching the open-ended zipper ends.

In one embodiment, a zipper guide is provided comprising a base comprising an upper surface, a trench formed in the upper surface, and a zipper tape attachment ledge raised above the upper surface configured for attachment to a zipper tape pin end; and a slider comprising an upper surface including a zipper tape attachment region configured for attachment to a zipper tape box end, a lower surface configured for sliding movement across the upper surface of the base, and a key protruding from the lower surface of the slider, the key configured to fit within the trench of the base at an orientation to guide the attached zipper tape box end toward the attached zipper tape pin end by planar sliding movements of the slider lower surface with respect to the base upper surface.

In one aspect of the zipper guide, the base comprises a planar member having a periphery, and the trench includes open ends and extends from one portion of the periphery to another portion of the periphery. In a further aspect, the trench includes two edges extending between the open ends, and one or both of the edges are straight, curved, or tapered.

In a further aspect of the zipper guide, the key comprises an elongated member having edges oriented at an angle to side edges of the periphery of the slider and at an angle to edges of the trenches when the key is located within the trench.

In a further aspect, the key comprises an elongated member having edges that are concave, convex, tapered, or straight.

In a further aspect, a height of the key is selected such that the lower surface of the slider contacts that upper surface of the base when the key is disposed within the trench.

In a further aspect, an edge of the zipper tape attachment ledge is spaced from an edge of the trench to provide an overhang region for the attached zipper tape pin end.

In a further aspect, the slider comprises a planar member having a height selected to conform to a height of the attachment ledge such that a pin of the attached zipper tape pin end can be inserted into a box of the attached zipper tape box end when the key is slid along the trench.

In a further aspect, edges of the key are beveled or rounded.

In a further aspect, edges of the periphery of the base, of the slider, or of both the base and the slider are beveled or rounded.

In a further aspect, the base, the slider, or both the base and the slider comprise cardstock, cardboard, matte board, wood, plastic, metal, or a solid foam.

In a further aspect, the base, the slider, or the base and the slider comprise a solid layer-by-layer construction.

In a further aspect, the base, the slider, or the base and the slider comprise two or more planar elements affixed together to form a unitary piece.

In a further embodiment, a zipper assembly is provided comprising an embodiment of a zipper guide; and an open-ended zipper comprising a first zipper tape having a first set of zipper teeth and a pin at a lower end of the first zipper tape, and a second zipper tape having a second set of zipper teeth and a box at a lower end of the second zipper tape, and a pull tab attached for slidable movement along the second set of zipper teeth, wherein the lower end of the first zipper tape is attached to the base and the lower end of the second zipper tape is attached to the slider.

In a further aspect of the zipper assembly, the first and second zipper tapes are attached to the base and the slider with an adhesive or with a mechanical fastener.

In a further aspect of the zipper assembly, the first and second zipper tapes are removably attached to the base and the slider.

In another embodiment, a computer-readable medium is provided that stores instructions that, when executed by at least one processor of an additive manufacturing device, cause the additive manufacturing device to generate three-dimensional objects comprising the base and the slider of an embodiment of a zipper guide.

In a further embodiment, a method of closing an open-ended zipper is provided comprising: providing a zipper guide; attaching a first zipper tape having a pin at one end to the ledge of the base, with the zipper teeth overhanging the ledge; attaching a second zipper tape having a box at one end to the upper surface of the slider, with the zipper teeth overhanging the edge of the slider; and bringing the key of the slider into contact with the trench of the base and sliding the key along the base until the pin enters the box through the pull tab.

DESCRIPTION OF THE DRAWINGS

The invention will be more fully understood from the following detailed description taken in conjunction with the accompanying drawings in which:

FIGS. 5A, 5B, and 5C are schematic views illustrating operation of the zipper guide;

FIGS. 6A-6E are schematic plan views of further embodiments of the slider with differing key configurations.

DETAILED DESCRIPTION OF THE INVENTION

Figure 1:
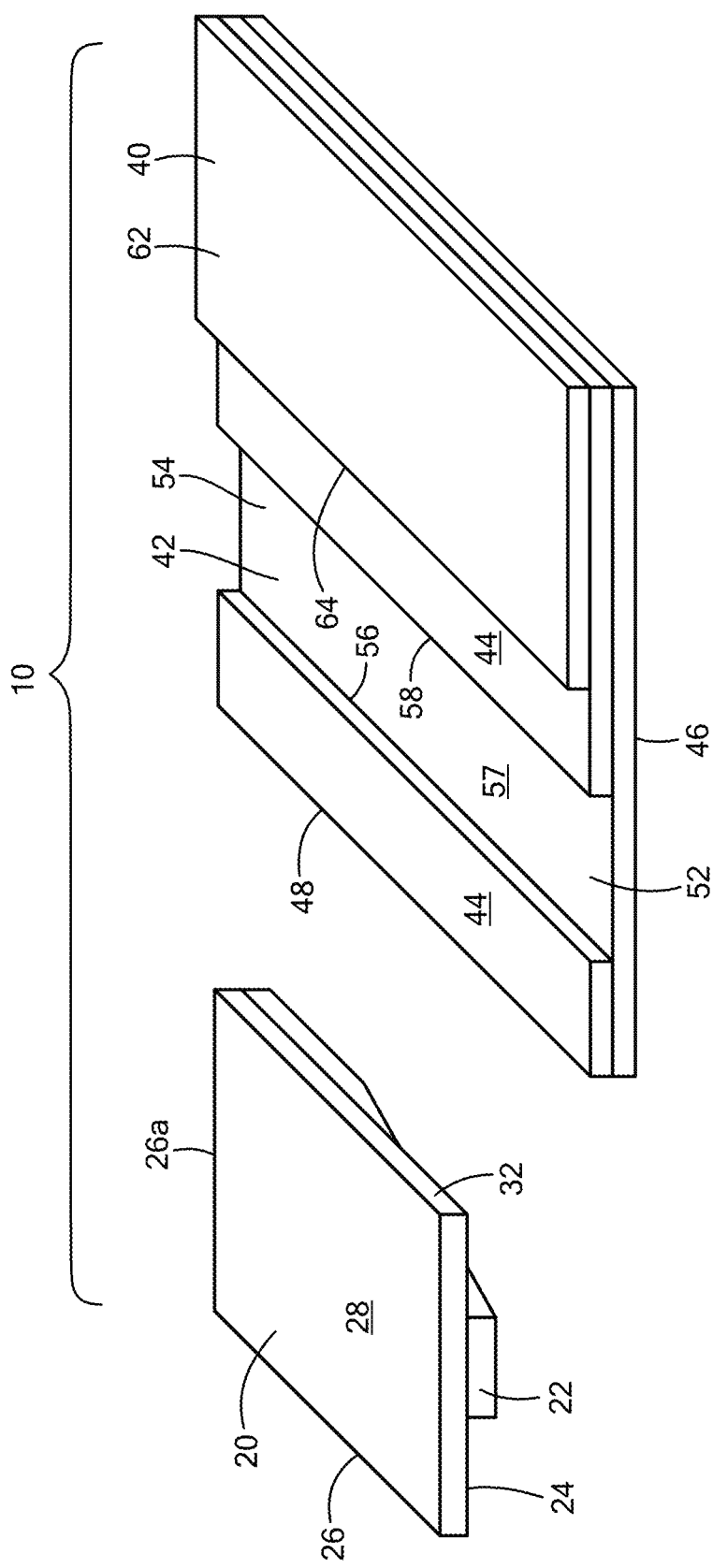
FIG. 1 is an isometric view of an embodiment of a zipper guide illustrating a base and a slider.

The disclosure of U.S. Provisional Application No. 61/977,312, filed on Apr. 9, 2014, is incorporated by reference herein.

Referring to FIGS. 1-5C, a zipper guide 10 comprises two components, a slider 20 and a base 40, each attached to one of the zipper tapes 120, 140. The slider 20 includes a key 22 on a lower surface 24 that slides within a trench or keyway 42 formed in an upper surface 44 of the base 40 to align the two ends 122, 142 of the zipper together and guide the pin 144 into the box 124.

Figure 2:
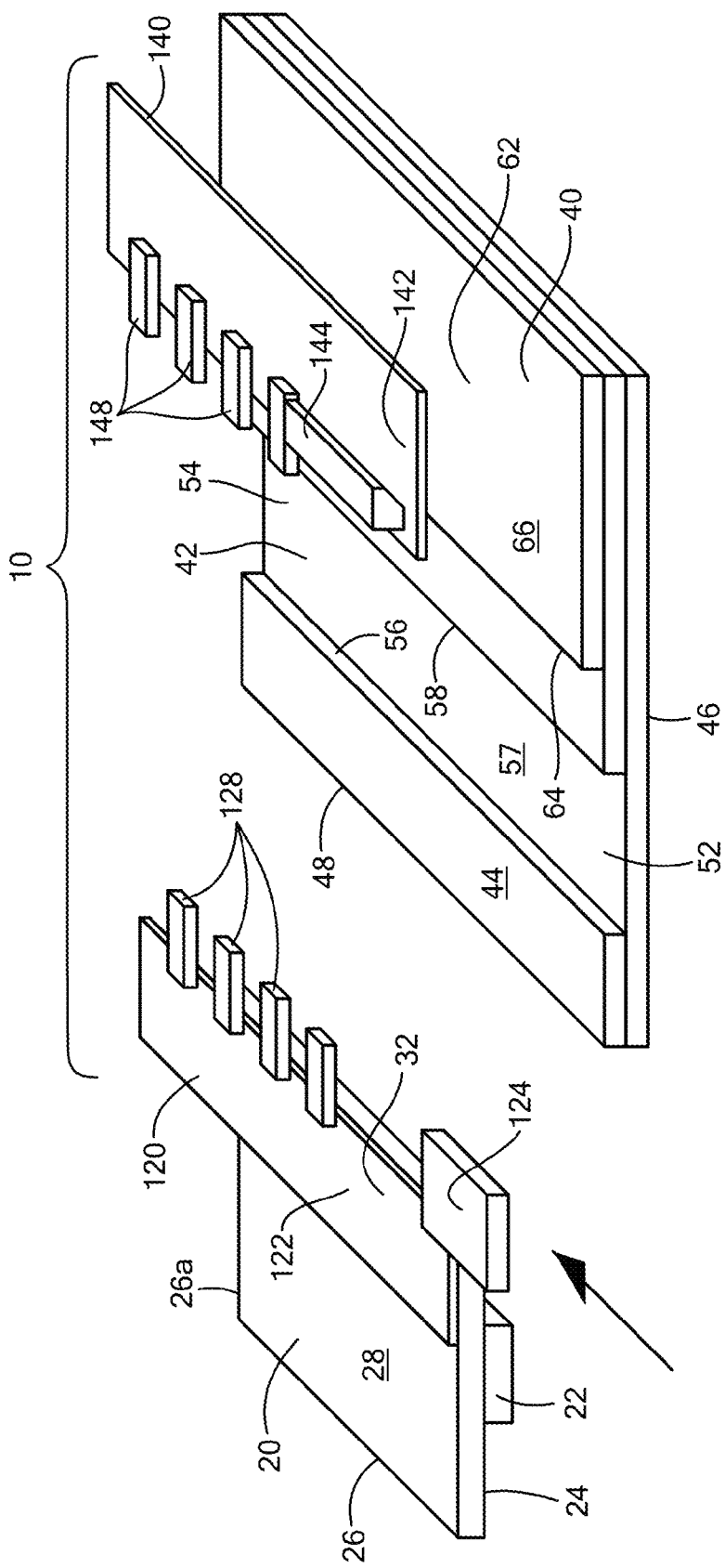
FIG. 2 is an isometric view of the zipper guide of FIG. 1 attached to an open-ended zipper'
Figure 3:
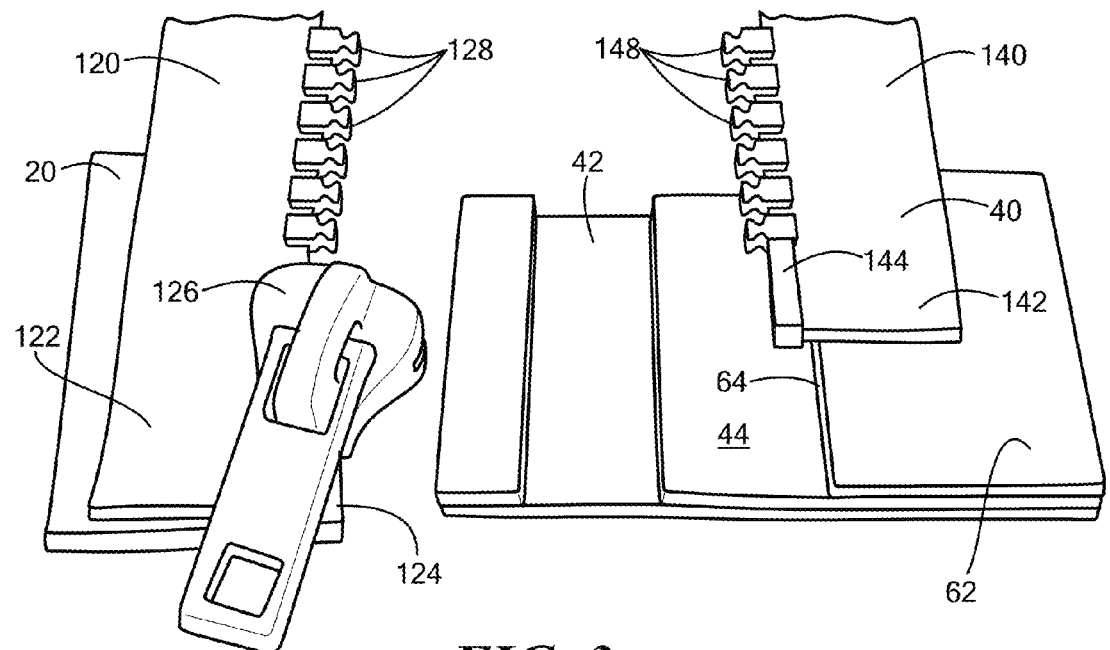
FIG. 3 is a top plan view of the zipper guide and zipper of FIG. 2 including the zipper pull tab.
Figure 4:
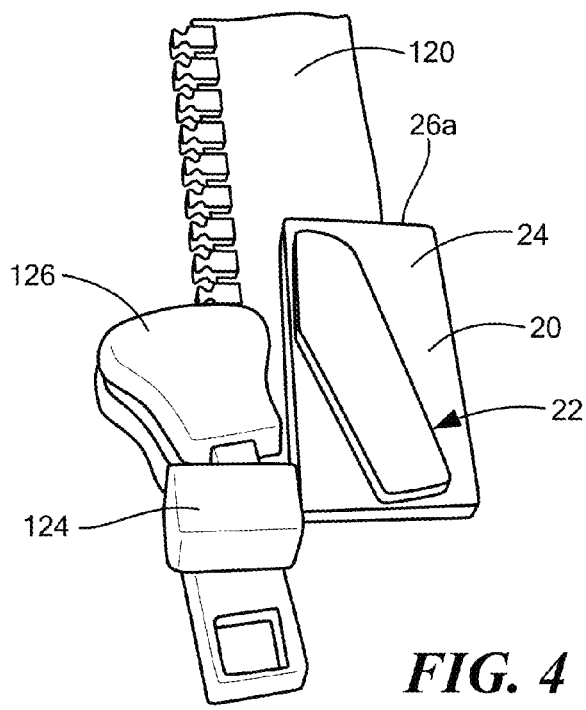
FIG. 4 is a bottom plan view of one of a box end zipper tape attached to the slider.

Referring more particularly to FIGS. 1 and 2, the base 40 is a generally planar member having the upper surface 44, a lower surface 46, and a periphery 48. The trench or keyway 42 is formed in a portion of the upper surface 44. The trench is open at both ends 52, 54 and extends along edges 56, 58 from one portion of the periphery to another portion of the periphery. A ledge 62 is formed above the upper surface 44 of the base 40. In the embodiment shown, the edge 64 of the ledge is generally parallel to the edges 56, 58 of the trench 42. The ledge 62 provides a raised surface 66 to which the end 142 of the zipper tape 140 near the pin 144 is attached. The zipper tape is not adhered along the full length of the ledge 62, but is spaced from the lower periphery 48a. This space allows the slider 20 to slide along the base 40 and orient itself properly before the pull tab 126 and the pin 144 meet. The teeth 148 of the zipper tape 140 extend beyond the edge 64 of the ledge 62, so that they are free to interlock with the teeth 128 of the other zipper tape 120.

The slider 20 is also a generally planar member having a periphery 26, an upper surface 28, and the lower surface 24. The key 22 protrudes from the lower surface 24 of the slider 20. The key, described further below, is configured to fit within the trench 42 of the base 40. The end 122 of the zipper tape 120 near the box 124 is attached along the upper surface 28 of the slider 20 with the teeth 128, box 124, and pull tab 126 of the zipper tape 120 extending beyond the edge 32 of the slider 20. The box 124 is also constrained against movement relative to the slider. The pull tab 126 is not affixed to the slider 20, but remains free to slide along the zipper teeth 128, so that the pin 144 on the other tape 140 can be inserted first into the pull tab 126 and then into the box 124 before the pull tab is pulled along the zipper teeth 128, 148 to interlock them. The tape 120 should be rigidly attached along substantially the full length of the slider 20 to avoid the upper end dangling, catching, and pulling off.

Figure 5C:
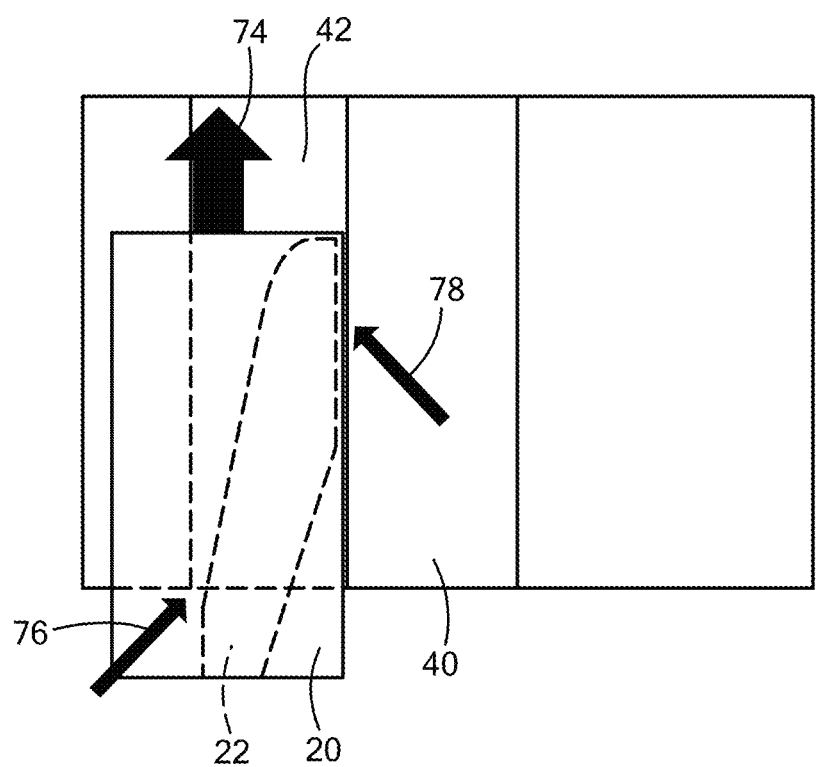
Figure 7A:
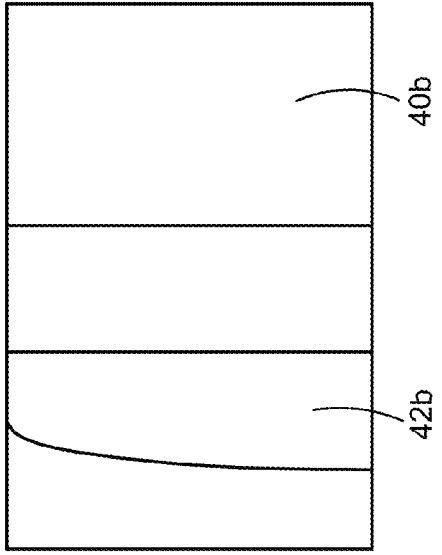
FIGS. 7A-7D are schematic plan views of further embodiments of the base with differing trench configurations.
Figure 7B:
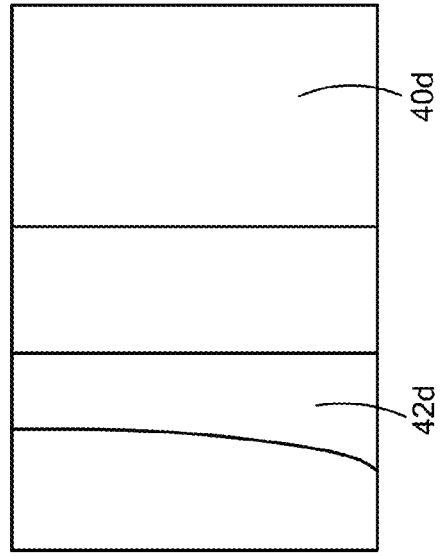
Figure 7C:
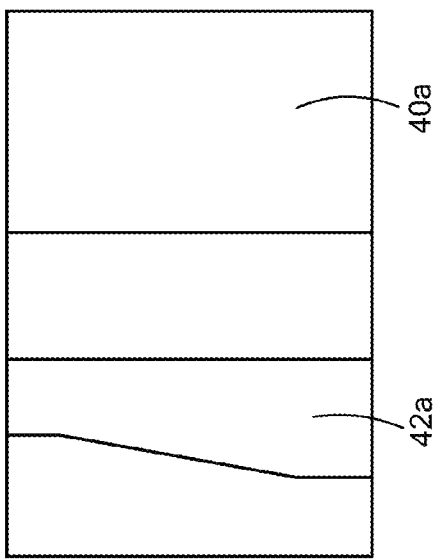
Figure 7D:
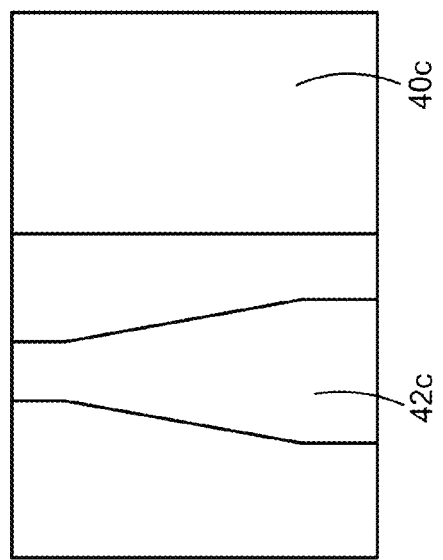

Referring to FIGS. 4 and 5A-5C, one embodiment of the key 22 is generally elongated and has edges 34, 36 that extend at an angle to the edges 56, 58 of the trench 42. In the embodiment shown in FIGS. 5A-5C, one corner of the key is cut away to provide a wall 38 so that the key does not protrude beyond the periphery of the slider 20. The wall 38 subsequently abuts the edge 58 of the trench 42 during sliding of the key within the trench (FIG. 5C). The width of the key at the tip 39 is narrower than the width of the trench, indicated at 72, so that the tip 39 of the key can be easily placed at a variety of locations within the trench by the user, effectively requiring only a single degree of freedom, indicated by large arrow 74, by the user to contact the key with the lower surface 57 of the trench 42. That is, to place the key in the trench, the upper edge 26a of the slider (opposite the box 124) is held in the region of the lower end of the base. If the key is initially placed on the surface 44 of the base, the user can move the slider around until feeling the key 22 drop into the trench 42. Once contact is made between the key 22 and the surface 57 of the trench, the user maintains contact by holding the slider 20 and base 40 together, which is an intuitive action. The user then moves the slider 20 toward the upper end of the base 40. The angled orientation of the key constrains the slider, indicated by arrows 76, 78, and in turn the box 124 on the slider, to move at an angle into contact with the pin 144 on the base 40. The pin can then enter into the pull tab 126 and into the box 124, joining the two ends 122, 142, and interlocking the teeth 128, 148. At this point, the user pulls the pull tab 126 on the zipper, and operates the zipper normally.

In FIGS. 1-5C, the slider is on the left of the base; it will be appreciated that the components can be reversed, such that the slider is on the right of the base.

It will be appreciated that the height, width and shape of the trench, the height of the ledge and the height of the key on the slider are selected to properly mate such that the box can be aligned with the pin and the pull tab can engage the teeth of both zipper tapes to interlock the teeth. For example, the height of the trench and the height of the key are generally the same. It will be appreciated that the spatial match can also be achieved via material compliance. For example, the key can be fabricated from a compliant material that compresses to allow the box to align with the pin.

The key 22 can have a variety shapes in addition to that shown in FIGS. 1-5C. Additional roundness, taper, or overall size of the key can be varied. FIGS. 6A-6E illustrate embodiments of sliders 20a, 20b, 20c, 20d, 20e, with keys 22a, 22b, 22c, 22d, 22e, having a variety of configurations. Similarly, the trench 42 can have a variety of shapes, such as a taper to assist in guiding the key. FIGS. 7A-7D illustrate embodiments of bases 40a, 40b, 40c, 40d with trenches 42a, 42b, 42c, 42d having a variety of configurations. In some embodiments, the contacting surfaces of the key and/or the trench could be sloped. It will be appreciated that combinations of the illustrated shapes for the key and trench can be provided. For example, the entrance to the trench could be smooth followed by a sharper corner or a straight segment. In another example, the trench could have a wider angle at the entrance and then change to a more narrow angle. It will also be appreciated that a given key configuration could operate with a variety of trench configurations, and similarly a given trench configuration could operate with a variety of key configurations. Also, the surface properties of the slider and base can be varied to provide different frictional qualities, ergonomics, speed, and/or control. For example, a more rounded key and a softer material surface could provide a smoother sliding motion. As another example, a more rigid key with a more angular shape could result in a "click" to alert the user that proper contact between the two surfaces has been made.

The slider 20 and the base 40 can attach to the zipper tapes 120, 140 in any suitable manner, such as with an adhesive; mechanical fasteners, such as rivets, clips, or hook and loop type fasteners; and the like. In some embodiments, the slider and the base can be attached to the zipper at the time of garment manufacture. In other embodiments, the slider and base can be retrofitted to an existing garment. The slider and base can be permanently affixed or removably affixed to the zipper.

In some embodiments, the total thickness of each component ranges from $1/16$ inch to $1/8$ inch; however, the components can be made thinner or thicker, depending on the application and the user. For thinner zipper guides, rigidity can be maintained via the material choice. The edges of the components can be protected from wear by wrapping the edges with a suitable material or by providing an edge covering if desired. The edges should also not be so sharp that they provide a cutting hazard to the user; toward this end, the edges can be blunted or rounded to reduce sharpness, or a suitable edge covering can be provided. In some embodiments, soft padding or edging can be added along one or more edges or corners.

The slider and the base are illustrated as having a rectangular shape in plan view. However, as long as the slider and base can cooperate to guide the zipper ends to interlock, any outer configuration can be selected. For example, an outer shape can be selected for pleasing visual qualities or attractiveness, ease of grasping, or user comfort. The outer shape can be selected to provide a recognizable brand shape.

The lateral dimensions of the slider and base can be selected to be readily grasped by a user. In some embodiments, lateral dimensions can range from 2 to 4 square inches; however, other dimensions can be used. For example, smaller dimensions can be used for applications in which the zipper guide is desired to be less obtrusive. Larger dimensions can be used for more rugged garments or where maximum aid for a user is desired.

The slider and the base can be made of any material with sufficient rigidity to act as a guide. Materials can also be selected for different ergonomics, fashion, cost, manufacturability, and branding. Suitable materials can include cardstock, cardboard, matte board, low- or high-quality wood, plastic, metal, or rigid dense foam.

The slider and base can be provided in any desired color or color combination. Decorative items or embellishments can be added. Features such as internal lighting or sound effects can be attached to or embedded within the components. The slider and base can be designed to match a garment, and can be provided with a garment as an extra item, similar to extra buttons.

The slider and the base can be fabricated in any desired manner, such as by additive manufacturing techniques, subtractive manufacturing techniques, or molding techniques. The two components can be manufactured as a single solid piece, or can be manufactured in multiple pieces that are subsequently joined together, as in layers that can be adhesively joined. In one embodiment, using an additive manufacturing technique such as 3D printing, a computer-readable medium can be provided with instructions that when executed by at least one processor of an additive manufacturing device, cause the additive manufacturing device to generate three-dimensional objects comprising the base and the slider of the zipper guide. In one embodiment, the slider and the base are formed by a solid layer-by-layer construction.

The zipper guide can be used by a wide variety of people. For example, the guide can be used by patients suffering from tremor for various reasons, such as Parkinson's disease or Essential Tremor, children who have difficulty using zippers; people with arthritis or other difficulty using their hands or arms; amputees or those without hands; and the blind or visually impaired. Written instructions and/or fiduciary markings on the base and/or slider can be provided to inform a user of proper attachment points and use of the guide.

The zipper guide is advantageous for a number of reasons. The guide reduces a three-dimensional, precision task to a one-dimensional push. The zipper guide can be attached non-invasively and reversibly to virtually any zippered garment or other item employing an open-ended zipper. The zipper guide can be outfitted to existing zippers of different materials and geometries.

What is claimed is:

1. A zipper assembly comprising:
   a base comprising an upper surface, a trench formed in the upper surface, and a zipper tape attachment ledge raised above the upper surface configured for attachment to a zipper tape pin end;
   a slider comprising an upper surface, a zipper tape attachment region disposed on the upper surface of the slider and configured for attachment to a zipper tape box end, a lower surface configured for sliding movement across the upper surface of the base, and a key protruding from the lower surface of the slider, the key configured to fit within the trench of the base at an orientation to guide the attached zipper tape box end toward the attached zipper tape pin end by planar sliding movements of the slider lower surface with respect to the base upper surface; and
   an open-ended zipper comprising a first zipper tape having a first set of zipper teeth and a pin at a lower end of the first zipper tape, and a second zipper tape having a second set of zipper teeth and a box at a lower end of the second zipper tape, and a pull tab attached for slidable movement along the second set of zipper teeth;
   wherein the lower end of the first zipper tape is attached to the base and the lower end of the second zipper tape is attached to the slider.

2. The zipper assembly of claim 1, wherein the base comprises a planar member having a periphery, and the trench includes open ends and extends from one portion of the periphery to another portion of the periphery.

3. The zipper assembly of claim 2, wherein the trench includes two edges extending between the open ends, and one or both of the edges are straight, curved, or tapered.

4. The zipper assembly of claim 1, wherein the key comprises an elongated member having edges oriented at an angle to side edges of the periphery of the slider and at an angle to edges of the trench when the key is located within the trench.

5. The zipper assembly of claim 1, wherein the key comprises an elongated member having edges that are concave, convex, tapered, or straight.

6. The zipper assembly of claim 1, wherein a height of the key is selected such that the lower surface of the slider contacts the upper surface of the base when the key is disposed within the trench.

7. The zipper assembly of claim 1, wherein an edge of the zipper tape attachment ledge is spaced from an edge of the trench to provide an overhang region for the attached zipper tape pin end.

8. The zipper assembly of claim 1, wherein the slider comprises a planar member having a height selected to conform to a height of the attachment ledge such that a pin of the attached zipper tape pin end can be inserted into a box of the attached zipper tape box end when the key is slid along the trench.

9. The zipper assembly of claim 1, wherein edges of the key are beveled or rounded.

10. The zipper assembly of claim 1, wherein edges of the periphery of the base, of the slider, or of both the base and the slider are beveled or rounded.

11. The zipper assembly of claim 1, wherein the base, the slider, or both the base and the slider comprise cardstock, cardboard, matte board, wood, plastic, metal, or a solid foam.

12. The zipper assembly of claim 1, wherein the base, the slider, or the base and the slider comprise a solid layer-by-layer construction.

13. The zipper assembly of claim 1, wherein the base, the slider, or the base and the slider comprise two or more planar elements affixed together to form a unitary piece.

14. The zipper assembly of claim 1, wherein the first and second zipper tapes are attached to the base and the slider with an adhesive or with a mechanical fastener.

15. The zipper assembly of claim 1, wherein the first and second zipper tapes are removably attached to the base and the slider.

16. A method of closing an open-ended zipper comprising:
providing a zipper guide comprising:
a base comprising an upper surface, a trench formed in the upper surface, and a zipper tape attachment ledge raised above the upper surface configured for attachment to a zipper tape pin end; and
a slider comprising an upper surface, a zipper tape attachment region disposed on the upper surface of the slider and configured for attachment to a zipper tape box end, a lower surface configured for sliding movement across the upper surface of the base, and a key protruding from the lower surface of the slider, the key configured to fit within the trench of the base at an orientation to guide the attached zipper tape box end toward the attached zipper tape pin end by planar sliding movements of the slider lower surface with respect to the base upper surface;
attaching a first zipper tape having a pin at one end to the ledge of the base, with the zipper teeth overhanging the ledge;
attaching a second zipper tape having a box at one end to the upper surface of the slider, with the zipper teeth overhanging the edge of the slider; and
bringing the key of the slider into contact with the trench of the base and sliding the key along the base until the pin enters the box through the pull tab.

* * * * *